United States Patent [19]
Troiano et al.

[11] Patent Number: 5,924,799
[45] Date of Patent: Jul. 20, 1999

[54] SEGMENTED PILOT BALL FOR USE IN A SPHERICAL BEARING AND METHOD FOR ASSEMBLING THE SAME

[75] Inventors: Edward Troiano, Clifton Park; Mark Fleszar, Troy; Craig Stanton, Rensselaer, all of N.Y.

[73] Assignee: The United States of America, as Represented by the Secretary of the Army, Washington, D.C.

[21] Appl. No.: 09/040,352

[22] Filed: Feb. 16, 1998

[51] Int. Cl.⁶ .................................................... F16C 23/04
[52] U.S. Cl. ............................................................. 384/208
[58] Field of Search .................................... 384/208, 206, 384/212; 29/898.049, 898.048

[56] References Cited

U.S. PATENT DOCUMENTS 5,062,208  11/1991  Goforth ............................. 29/898.049
5,477,614  12/1995  Watanabe .......................... 29/898.049

*Primary Examiner*—Lenard A. Footland
*Attorney, Agent, or Firm*—John F. Moran; Michael C. Sachs

[57] ABSTRACT

A segmented pilot ball is assembled within a spherical bearing for processing a self lubricating liner. The two-part pilot ball includes a major annularly shaped hollow segment with a smaller cutout portion. A minor segment has the shape of the cutout portion so that when the major and minor segments are assembled, the minor segment complements the major segment to define the spherical outer shape of the pilot ball. An inner plug is shaped to fit within the assembled major and minor segments to provide a compressive force and interior support to the pilot ball within the outer race of the bearing. The bearing is formed by applying uncured liner material to the inner surface of the outer race either before or while rotating the outer race, to evenly distribute the liner and to increase the rate of drying. The outer race is then rotated while heating, in order to reduce liner flow and to form a uniform coating. The major segment is inserted inside the outer race, and is then rotated so that it mates with the outer race. The minor segment is inserted into position for assembly with the major segment, and the plug is then inserted co-axially with the assembled major and minor segments to form the pilot ball. Once the bearing is formed and the outer race is cured, the pilot ball is disassembled and removed.

7 Claims, 3 Drawing Sheets

SEGMENTED PILOT BALL FOR USE IN A SPHERICAL BEARING AND METHOD FOR ASSEMBLING THE SAME

The invention described herein may be manufactured and used by or for the Government of the United States for governmental purposes.

FIELD OF THE INVENTION

The present invention relates in general to spherical bearings. More specifically, the present invention relates to a segmented pilot ball for use in a spherical bearing, and a method for assembling the pilot ball within the bearing, for processing a self lubricating liner.

BACKGROUND OF THE INVENTION

A conventional spherical bearing is typically composed of three main components: a metal outer race, a polymeric low friction liner, and a metal spherical ball that travels along the outer race in contact with the liner. The liner is a composite material that is applied to the inner surface of the outer race in an uncured state, and is then dried, rolled and formed by curing on the inner surface of the outer race. The cured liner is designed to act as a self lubricating bearing surface.

A major manufacturing process for spherical bearing manufacturing includes the insertion of a pilot ball to apply pressure during curing to form the final interference fit between the outer race inner surface and the outer surface of the pilot ball.

Snapping and swaging represent the two predominant current methods for inserting the pilot ball into a spherical bearing. Snapping includes ovalizing the outer race to enable the insertion of the solid spherical pilot ball, while swaging includes pushing the solid spherical pilot ball into the outer race. Both of these methods require expensive equipment for the elastic or plastic deformation of the outer race. In addition, these conventional methods also require a large amount of deflection of the outer race. This deflection can cause the outer race to crack and to ultimately damage the bearing, to compromise the safety of the assembly operator. For instance, the snapping assembly method requires that the operator insert the pilot ball while the outer race is being ovalized by a large radial force. If the stored energy in the bearings outer race were released, and the ball is ejected from the cracked outer race, a fatal accident can ensue.

In addition to the safety and cost considerations, the yield of these two conventional assembly methods is not optimal, since excessive deflection of the outer race can cause some permanent distortion or an increase in the outer diameter to become larger than the pilot ball diameter. This frequently results in cracked outer races and scrapped bearings, after a significant amount of time and money have been invested in manufacturing and assembling the scrapped bearings.

Attempts have been made to improve the conventional assembly techniques by redesigning either the outer race or the liner, while retaining the integral spherical solid design of the pilot ball. Nonetheless, these attempts have not proven to be completely satisfactory.

SUMMARY OF THE INVENTION

It is an object of the present invention to provide a segmented pilot ball for use in processing a spherical bearing, and a method for assembling the pilot ball within the bearing.

The new pilot ball eliminates the difficulty of insertion within the outer race by eliminating the need for deforming the outer race, thus improving yield and simultaneously reducing distortion of the liner. In addition, the segmented pilot ball can eliminate the need to pre-dry the liner after rolling, and reduces injury risk to the assembly operator. The assembly of the pilot ball within the spherical bearing does not require expensive equipment.

The foregoing and additional features and advantages of the present invention are realized by a new segmented pilot ball which is assembled within a spherical bearing for processing a self lubricating liner. The pilot ball includes an annularly shaped hollow major segment having a cutout portion. A minor segment has the shape of the cutout portion so that when the major and minor segments are assembled, the minor segment complements the major segment to define the spherical outer shape of the pilot ball. A plug is shaped to fit within the assembled major and minor segments to provide interior support to the pilot ball within the outer race of the bearing.

The bearing is formed by applying uncured liner material to the inner surface of the outer race either before or while rotating the outer race. The application of the liner material while revolving the outer race helps to disperse the coating evenly. The outer race is then heated while being rotated, minimizing liner flow and forming a more uniform coating. The major segment in inserted inside the outer race, and is then rotated so that it mates with the outer race. The minor segment is inserted into position for assembly with the major segment, and the plug is then inserted co-axially with the assembled major and minor segments to form the pilot ball. Once the bearing is formed and the outer race is cured, the pilot ball is disassembled and removed.

BRIEF DESCRIPTION OF THE DRAWING

The above and other features of the present invention and the manner of attaining them will become apparent, and the invention itself will be best understood, by reference to the following description and the accompanying drawing, wherein.

Similar numerals refer to similar elements in the drawing. It should be understood that the sizes of the different components in the figures are not necessarily in exact proportion or to scale, and are shown for visual clarity and for the purpose of explanation.

DETAILED DESCRIPTION OF THE PREFERRED EMBODIMENT

Figure 3:
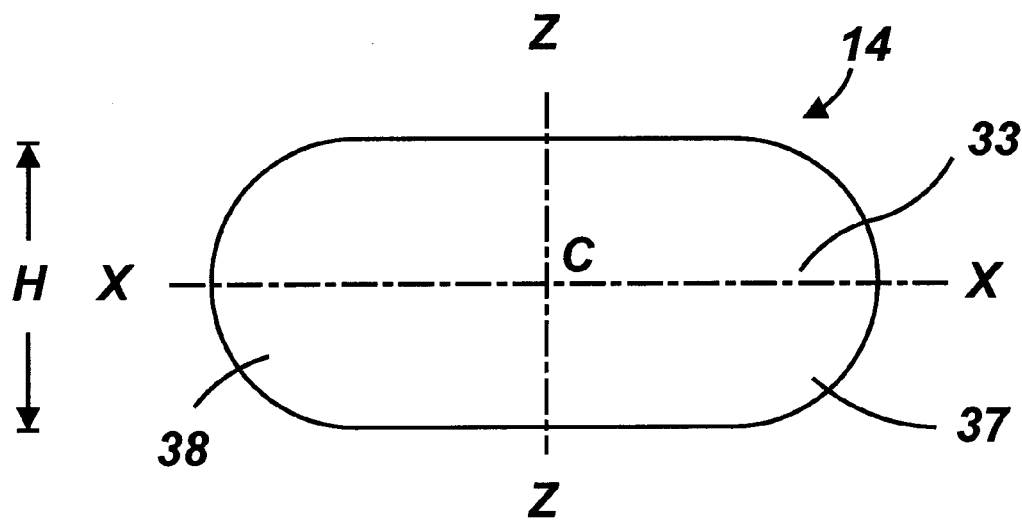
FIG. 3 is a top plan view of a minor segment forming part of the segmented pilot ball according to the present invention.
Figure 4:
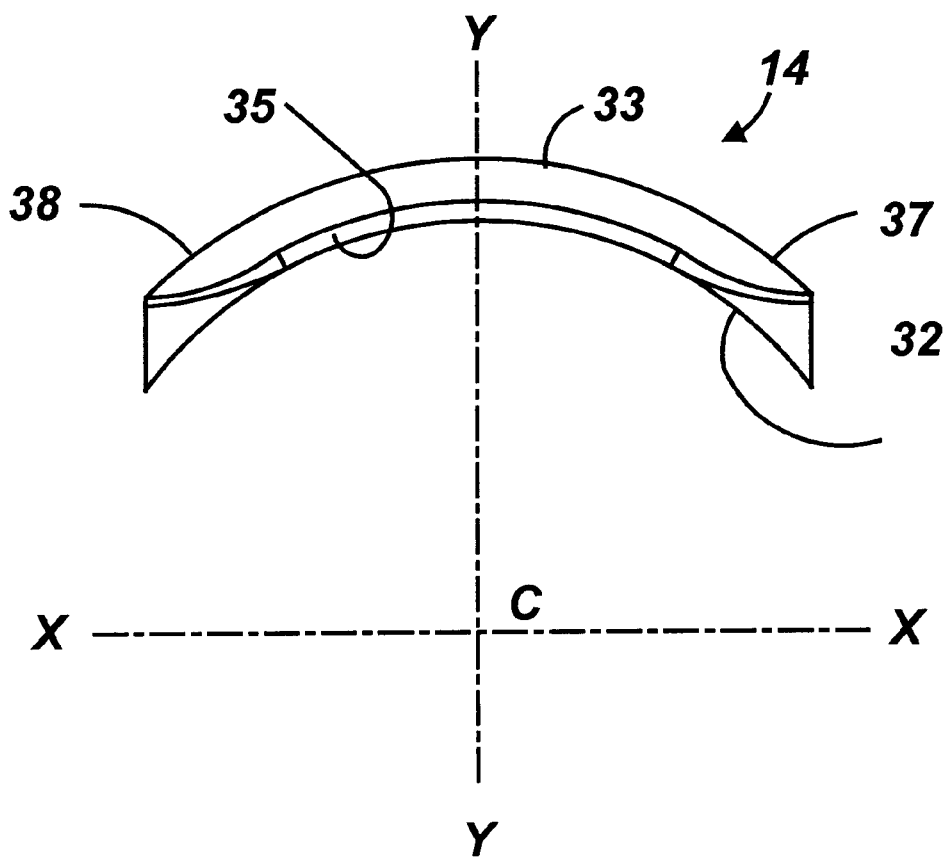
FIG. 4 is a side view of the minor segment of FIG. 3.
Figure 5:
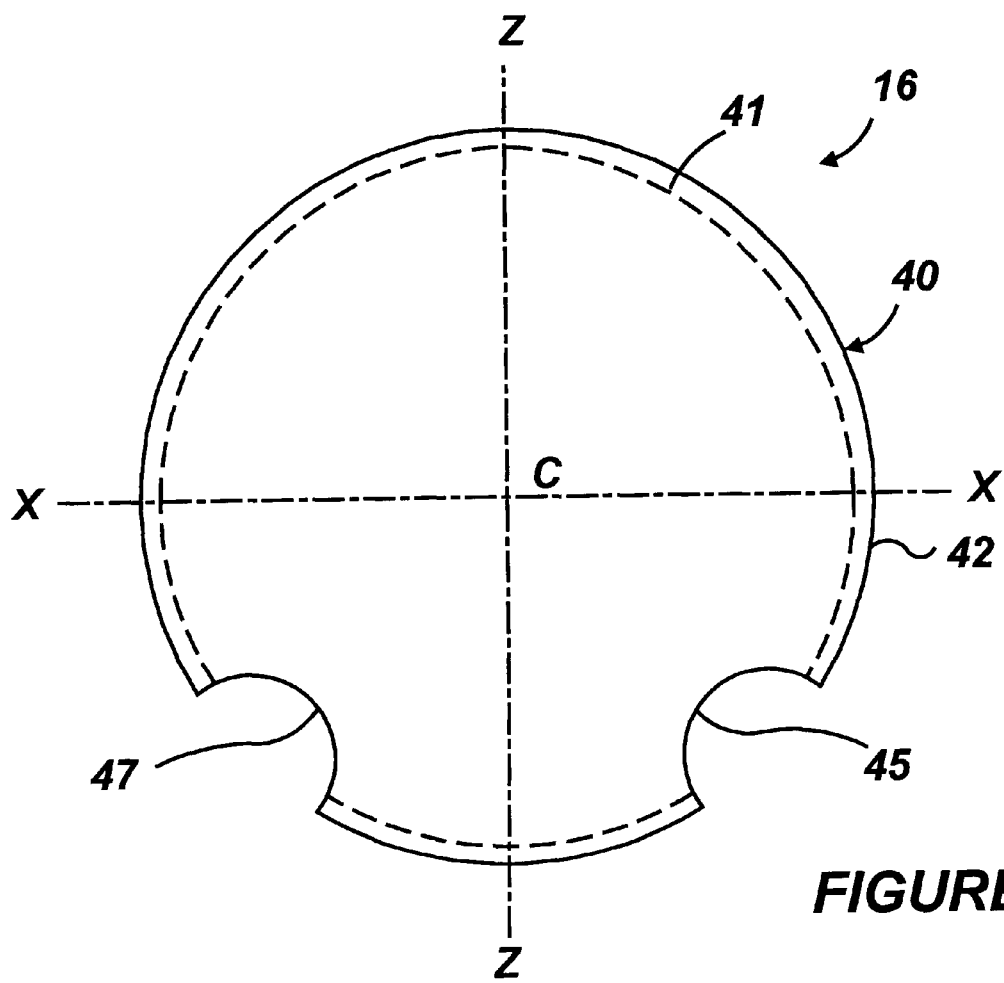
FIG. 5 is a top plan view of a plug forming part of the segmented pilot ball according to the present invention.
Figure 6:
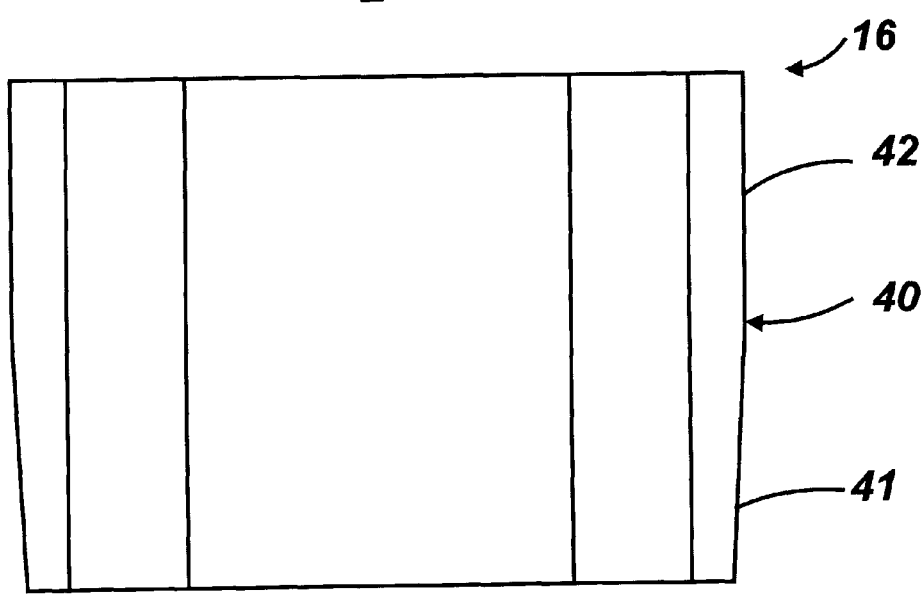
FIG. 6 is a side view of the plug of FIG. 5.

FIGS. 1 through 6 illustrate the three major components of the segmented pilot ball 10 of the present invention, namely a major segment 12 (FIGS. 1 and 2); a minor segment 14 (FIGS. 3 and 4); and a plug 16 (FIGS. 5 and 6). Each of these components will now be described in detail.

Figure 1:
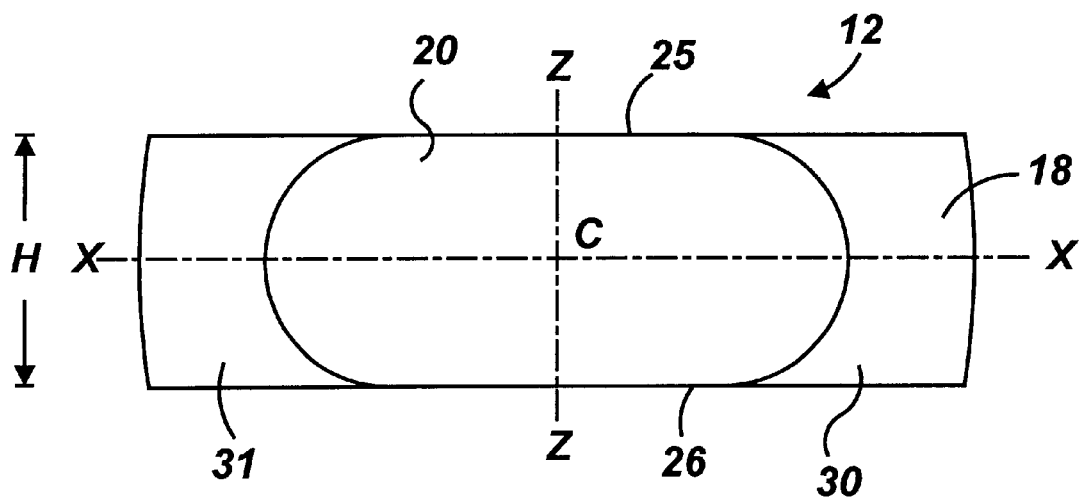
FIG. 1 is a top plan view of a major segment forming part of the segmented pilot ball according to the present invention.
Figure 2:
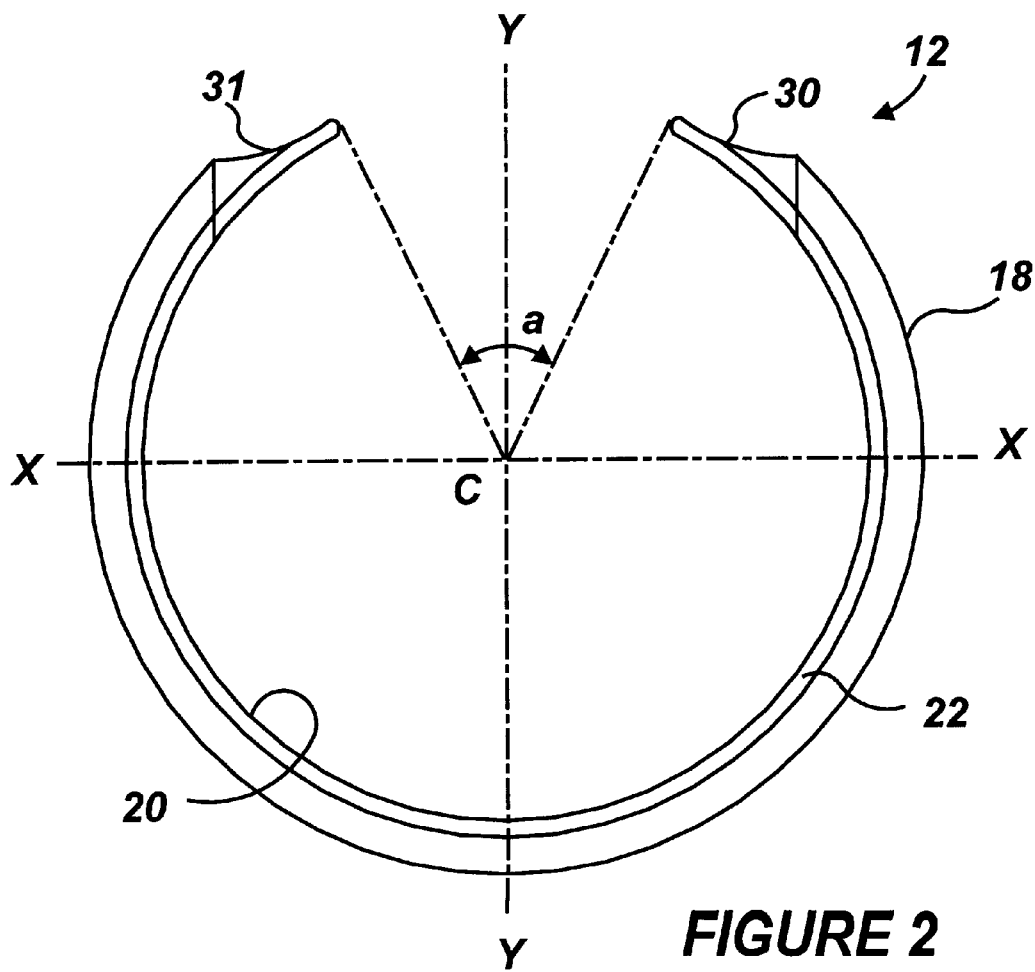
FIG. 2 is a side view of the major segment of FIG. 1.

With reference to FIGS. 1 and 2, the major segment 12 has the general shape of a hollow annular ring with part of which being cut out. The major segment 12 has an arcuately shaped outer surface 18 that follows the contour of a hypothetical sphere centered around center point C. The major segment 12 is also defined by a cylindrically shaped inner surface 20 with its axis passing through the center point C. Two flats 22 are respectively formed at the edges 25, 26 of the major segment 12 for safety purposes, The height H of the major segment 12 is not critical, but it should be sufficient to ensure insertion into an outer race (not shown). In one example, the height H is approximately 1.53 inches. The diameter of the outer surface 18 is approximately 4.98 inches and the diameter of the inner surface 20 is approximately 4.32 inches.

The major segment 12 includes a cutout portion which is shaped and dimensioned to receive the minor segment 14. The cutout portion is defined by two symmetrical and hemispherically shaped opposite ends 30, 31. It should be understood that the exact shape and dimensions of the cutout portion is not critical so long as the minor segment 14 fits therewithin and is held frictionally by the major segment 12. In the above design, the curvature diameter of the ends 30, 31 is equal to the height H (i.e., 1.53 inches), and the cutout portion defines an angle "a" of approximately 90 degrees with the center point C.

With reference to FIGS. 3 and 4, the minor segment 14 has the general shape of the cutout portion of the major segment 12, so that the minor segment 14 complements the major segment 12 in forming the complete spherical outer ring shaped structure of the pilot ball 10.

In this respect, the minor segment 14 has an inner surface 32 with the same curvature as that of the inner surface 20 of the major segment 12. The minor segment 14 also has an outer surface 33 with the same curvature as that of the outer surface 18 of the major segment 12. In addition, a flat 35 is formed for safety purpose. As a result, the minor segment 14 is capable of sliding naturally into position relative to the major segment 12. When the major and minor segments 12, 14 are assembled, the curvature of the minor segment 14 is also centered around the center point C of the major segment 12.

The minor segment 14 includes two hemispherically shaped ears 37, 38 that are similarly shaped and dimensioned as the ends 30, 31 of the major segment 12 in order to fit therewithin. In the example given above, the height H of the minor segment 14 corresponds to that of the major segment 12.

With reference to FIGS. 5 and 6, the plug 16 is solid and generally cylindrically shaped, so as to fit within the ring shaped structure of the assembled major and minor segments 12, 14, and to provide interior support thereto. To this end, the plug 16 has an outer surface 40 with a tapered section 41 and a straight section 42. When the major and minor segments 12, 14 are assembled, the tapered section 41 is introduced within the inner surface of the ring structure. As the plug 16 is slid down, the diameter of the plug 16 increases until it reaches the straight section 42, whereupon the plug diameter remains uniform. The diameter of the straight section 42 is approximately 0.0005 inch smaller than the diameter of the inner surfaces 20 and 32 of the major and minor segments 12, 14, respectively, so that the plug 16 can be lodged snugly within the interior of the ring structure in order to maintain the structural integrity of the pilot ball 10, while processing the liner.

The plug 16 also includes a plurality of axial cutout sections with a semi circular cross-section in order to prevent burrs along the inner surfaces 20, 32 of the major and minor segments from interfering with the smooth travel progress of the plug 16. While in this particular example two axial cutouts 45, 46 are illustrated, it should be understood that a different number of axial cutouts may alternatively be used. In addition, while the plug 16 is described herein as being solid, it should understood that the plug 16 may be hollow.

The plug height is not a critical requirement, as long as it maintains contact with the major and the minor segments 12, 14. In order to prevent problems resulting from thermal tolerance buildup during curing, the major segment 12, the minor segment 14 and the plug 16 are made of the same material, such as stainless steel.

In use, a predetermined quantity of uncured liner material is weighed, for instance 14 to 20 grams. As used herein, liner material refers to a lowfriction coating material. The bearing race is placed in an oscillation device (not shown) capable of rotation at a rate of approximately 40 to 80 rpm/minute. The liner material is applied as evenly as possible on the inner surface of the outer race, before or while the oscillation device is spun for approximately one hour at about 50 rpm/minute, in order to help reduce the solvent contained in the liner formulation to maintain an even liner distribution.

The liner and the outer race assembly are then removed and placed in a retaining fixture (not shown) inside an oven that has been preheated at 110° F. The retaining fixture, and the liner and outer race assembly are rotated inside the oven at approximately 10 rpm/minute, so that as the liner is heated, it maintains a uniform coating thickness. The outer race is removed from the oven, and, using a horizontal milling machine, the outer race is set on a twin roller bearing stand, and the liner surface is then rolled within 0.0005 inch to 0.001 inch of the final inner diameter.

The major segment 12 is then inserted within the outer race with its cutout section facing upwardly. The major segment 12 is then rotated about 90 degrees so that its outer surface 18 mates with the inner surface of the outer race. The minor segment 14 is then inserted into position in contact with the major segment 12. The plug 16 is finally inserted into position with its axis co-aligned with the axis of the outer race. In order to cure the liner, the outer race and pilot ball assembly is placed in an oven that has been preheated to 180° F., and heated for 3 hours and 45 minutes. The oven temperature is then raised to approximately 350° F. and the liner, the outer race and pilot ball assembly is heated for 2 hours and 30 minutes. After curing, the entire assembly is allowed to cool to room temperature. The pilot ball 10 is then disassembled by removing the plug 16, the minor segment 14 and the minor segment 12.

The inventive concept of the segmented pilot ball 10 provides a much safer and easier way of inserting a pilot ball into the outer race of the bearing prior to the liner curing process. The segmented pilot ball 10 does not require any elastic or plastic deformation of the bearing outer race, which ensures the safety of the operation in the event of a sudden failure. Another benefit achieved by the present invention is that no expensive equipment is needed for inserting the segmented pilot ball 10 into the outer race of the bearing. The new assembly method represents a clear improvement over conventional methods since the outer race is not at risk of being cracked or damaged during the insertion of the pilot ball 10.

It should be apparent that many modifications may be made to the invention without departing from the spirit and scope of the invention. Therefore, the drawings, and description relating to the use of the invention are presented only for the purposes of illustration and direction.

What is claimed is:

1. A segmented pilot ball for use in a spherical bearing, comprising in combination:

an annularly shaped hollow major segment including a cutout portion;

a minor segment having the shape of said cutout portion so that said when said major and minor segments are assembled, said minor segment complements said major segment to define the outer shape of the pilot ball; and a plug shaped to fit within said assembled major and minor segments to provide interior support thereto.

2. The segmented pilot ball as in claim 1, wherein said major segment has an arcuately shaped outer surface that follows the contour of a hypothetical sphere.

3. The segmented pilot ball as in claim 2, wherein said major segment cutout portion is defined by two symmetrical and hemispherically shaped opposite ends.

4. The segmented pilot ball as in claim 3, wherein said minor segment includes two hemispherically shaped ears that are substantially similarly shaped and dimensioned as said ends of said major segment cutout portion in order to fit therewithin.

5. The segmented pilot ball as in claim 4, wherein said plug is generally cylindrically shaped, so as to fit within said annularly shaped assembled major and minor segments.

6. The segmented pilot ball as in claim 5, wherein said plug has an outer surface with a tapered section and a straight section.

7. The segmented pilot ball as in claim 6 wherein said plug further includes one or more axial cutout sections.

\* \* \* \* \*